United States Patent
Nguyen et al.

(10) Patent No.: US 6,897,713 B1
(45) Date of Patent: May 24, 2005

(54) METHOD AND APPARATUS FOR DISTRIBUTED VOLTAGE COMPENSATION WITH A VOLTAGE DRIVER THAT IS RESPONSIVE TO FEEDBACK

(75) Inventors: Huy M. Nguyen, San Jose, CA (US); Benedict C. Lau, San Jose, CA (US); Adam Chuen-Huei Chou, San Jose, CA (US); Roxanne T. Vu, San Jose, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 10/076,666

(22) Filed: Feb. 14, 2002

(51) Int. Cl.[7] .................................................. G05F 1/10
(52) U.S. Cl. ........................ 327/541; 327/56; 327/57; 327/543; 323/316
(58) Field of Search ................................ 327/530, 538, 327/540, 541, 543, 545, 546, 51, 52, 53, 54, 55, 56, 57; 323/312, 313, 314, 315, 316; 365/189.07, 207, 210

(56) References Cited

U.S. PATENT DOCUMENTS

| | | | | |
|---|---|---|---|---|
| 4,604,732 A | * | 8/1986 | van Tran | ..................... 365/207 |
| 5,426,616 A | * | 6/1995 | Kajigaya et al. | ............ 365/226 |
| 5,999,031 A | | 12/1999 | Jang | |
| 6,028,438 A | | 2/2000 | Gillette | |
| 6,118,265 A | | 9/2000 | Larsen et al. | |
| 6,154,065 A | * | 11/2000 | Komatsu | ...................... 327/56 |
| 6,229,383 B1 | * | 5/2001 | Ooishi | ........................ 327/540 |
| 6,239,652 B1 | * | 5/2001 | Oh et al. | ..................... 327/541 |
| 6,288,954 B1 | * | 9/2001 | Manning | .................... 365/201 |
| 6,459,398 B1 | | 10/2002 | Gureshnik et al. | |

FOREIGN PATENT DOCUMENTS

| | | |
|---|---|---|
| JP | 60163528 A | 8/1985 |
| JP | 05274810 A | 10/1993 |

OTHER PUBLICATIONS

US 6,300,790, 10/2001, Veenstra et al. (withdrawn)

* cited by examiner

*Primary Examiner*—Terry D. Cunningham
(74) *Attorney, Agent, or Firm*—Lee & Hayes, PLLC

(57) ABSTRACT

An integrated circuit has one or more components that operate with reference to a distributed reference voltage. A reference voltage driver produces a compensated reference voltage, and the compensated reference voltage is distributed to form the distributed reference voltage at the components. Due to factors such as trace resistance and gate leakage, the distributed reference voltage is degraded relative to the compensated reference voltage. The reference voltage driver is responsive to feedback derived from the distributed reference voltage to adjust the compensated reference voltage so that the distributed reference voltage is approximately equal to a nominal reference voltage.

12 Claims, 4 Drawing Sheets

METHOD AND APPARATUS FOR DISTRIBUTED VOLTAGE COMPENSATION WITH A VOLTAGE DRIVER THAT IS RESPONSIVE TO FEEDBACK

TECHNICAL FIELD

This invention relates to adjusting voltages used in circuits such as integrated circuits.

BACKGROUND

As CMOS and other semiconductor technologies shrink in size, there are corresponding improvements in device capacity, bandwidth, and cost. However, shrinking process technologies also present challenges, often requiring designers to compensate for various undesirable side-effects.

As an example, as semiconductor processing technologies have improved, the interconnect traces that semiconductor devices manufacturers use to interconnect components on integrated circuits have become much smaller in both width and depth. Because of this, such traces are often more resistive than in the past. Furthermore, smaller sizes and thinner oxide layers often increase the current leakage of transistor gates. These two factors combine to produce higher voltage drops along device interconnect traces. Such voltage drops can pose problems in many situations, including for example, reduced voltage margins and signal integrity.

The increased density of semiconductor devices also increases the coupling of noise from adjacent traces and device elements.

Compounding these problems is the tendency of many newer devices to utilize lower signal voltages. Voltage drop and noise coupling become even more problematic in the face of such lower absolute and relative voltages.

Various forms of differential signaling are often used to address the problems mentioned above. In one form of differential signaling, often referred to as "pseudo-differential" signaling, a common reference voltage is distributed to multiple signal receivers. Signal voltages are then specified relative to the reference voltage.

To reduce the effects of voltage drop and noise coupling, both a signal and its associated reference voltage are given similar physical routings. Because of their similar routings, both the signal and the reference voltage are subject to similar degrading influences (such as voltage drop and noise coupling), and the signal voltage therefore maintains a generally fixed—or at least proportional—relationship with the reference voltage.

FIG. 1 shows an example of a prior art circuit 10 using pseudo-differential signaling. The circuit has a plurality of signal or data receivers 12, each of which receives one of signals $D_0$ through $D_3$. In addition, a common reference voltage $V_{ref}$ is distributed to each of receivers 12.

In a circuit such as this, the receivers 12 are often arranged in a star or "Kelvin" configuration, in which the traces that distribute $V_{ref}$ to each receiver are approximately the same length. Furthermore, in many implementations the signals $D_0$ through $D_3$ are routed so that they have similar lengths as the traces that conduct $V_{ref}$, and are therefore subject to similar signal degradations such as noise coupling and voltage drops.

The signals can be digital data signals or analog signals. In either case, the receivers interpret the respective signals $D_0$ through $D_3$ by comparing them to the reference voltage $V_{ref}$, and in response produce output signals $O_0$–$O_3$.

The techniques illustrated in FIG. 1 are effective to some degree, but can be insufficient in devices where interconnect resistances are high and/or where there are large leakage currents. In FIG. 1, for example, trace resistance is represented by discrete resistor elements R and leakage currents are represented by I. The voltage drop over the length of the $V_{ref}$ traces is equal to the product of I and R. As an example, the traces of a modern CMOS process might exhibit a resistance of 100 milli Ohms per square of trace length. Leakage currents might be on the order of 200 nA per squared micron. Assuming a trace length of 1000 microns and a trace width of 0.33 microns, a typical interconnection scheme might produce a voltage drop of approximately 192 mV between the nominal reference voltage and the actual voltage as it is received by various components.

Such a drop in reference voltage $V_{ref}$ can result in significantly decreased margin or "headroom" between $V_{ref}$ and ground: as $V_{ref}$ approaches ground, there is a smaller and smaller range of voltages that qualify as "low" in comparison to $V_{ref}$. This has the effect of increasing the sensitivity of the circuit to noise. The problem is particularly acute in high-speed devices where even the nominal or ideal $V_{ref}$ value is relatively low. In devices such as these, any further lowering of $V_{ref}$ threatens to significantly impair device operation. Furthermore, as semiconductor process technologies continue to shrink and operating voltages continue to decrease, voltage drops such as this will become even more significant.

DETAILED DESCRIPTION

Figure 1:
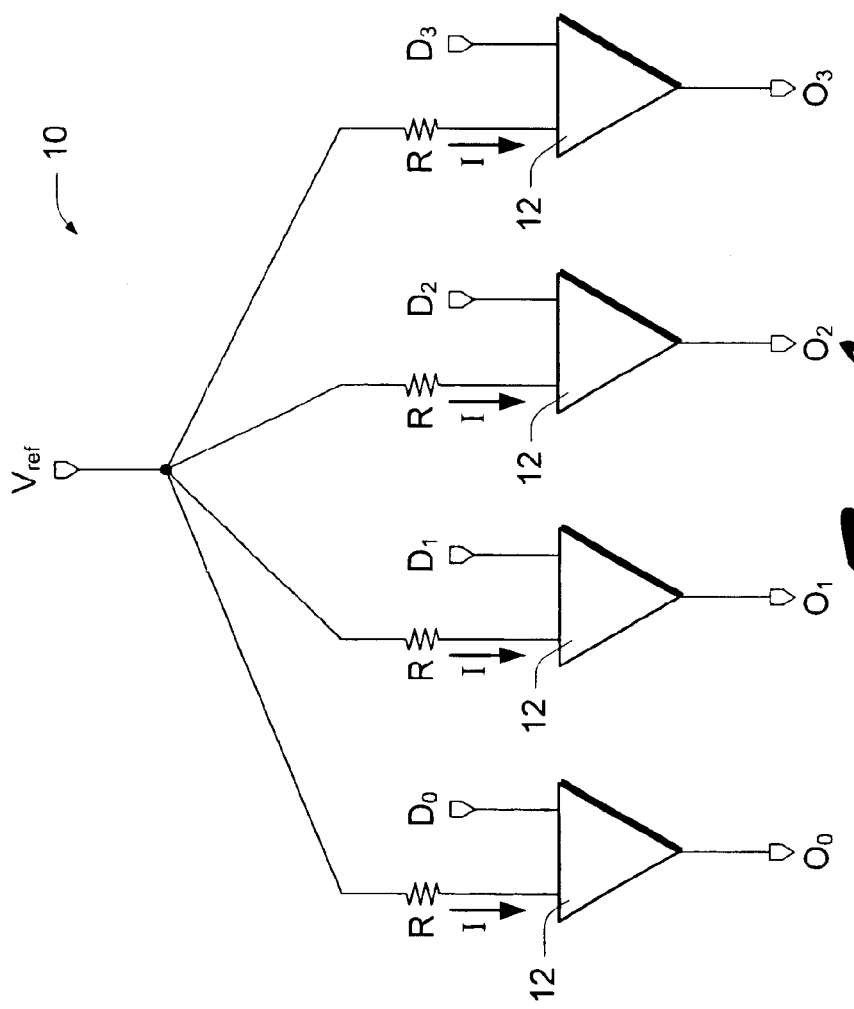
FIG. 1 is block diagram showing distribution of a reference voltage in accordance with the prior art.
Figure 2:
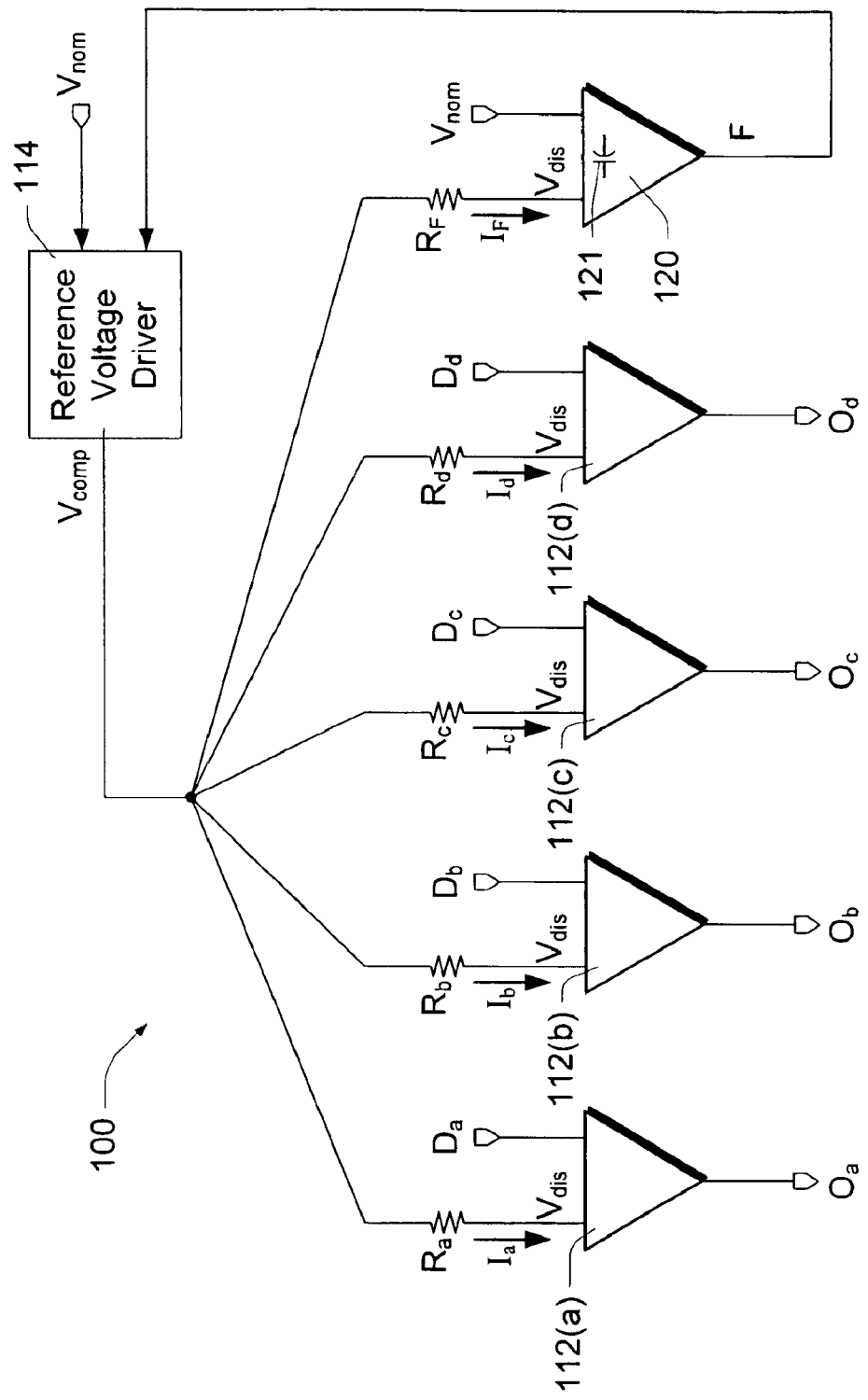
FIG. 2 is a schematic view illustrating an embodiment of a circuit that provides a compensated reference voltage.

FIG. 2 shows pertinent components of an integrated circuit 100 that utilizes voltage compensation. The integrated circuit can be implemented using semiconductor processing technologies, including CMOS and bipolar processing technologies, as well as by other present and future circuit technologies. The present invention may also be implemented on printed circuit board (using for example PCB fabrication technology), and/or using discrete devices.

As an example, integrated circuit 100 might comprise a memory device having a plurality of memory storage cells and various control circuits to facilitate writing to and reading from the storage cells. Various types of memory devices might utilize the illustrated components or similar components that make use of the illustrated principles, such as DRAM, EDO DRAM, SRAM, SDRAM, and Rambus® DRAM. Many of these memory devices use differential and/or pseudo-differential for internal and/or chip-to-chip data communications, and rely to varying degrees on various types of voltages, including reference voltages, being maintained within very close tolerances.

The integrated circuit of FIG. 2 includes one or more components 112 that operate with reference to a distributed reference voltage. In the described embodiment, components 112 comprise means for evaluating a plurality of data signals relative to a distributed reference voltage. More specifically, such means comprise a plurality of signal receivers, designated by reference numerals 112(a) through 112(d). The receivers are configured to evaluate corresponding signals $D_a$ through $D_d$ relative to a distributed reference voltage $V_{dis}$. Although four signals and four signal receivers are shown in FIG. 2, the present invention may be implemented with any number of signals and signal receivers.

In the described embodiment, the data signals are digital signals representing binary data such as memory read/write data, control data, address data, etc. In other embodiments components 112 might be configured to evaluate other types of signals, including analog signals.

Although the signal receivers shown in FIG. 2 can be of different types, the described embodiment utilizes differential data receivers, each of which compares two input voltages and produces a binary output signal as a function of which of the voltages is greater. The binary output signals are designated in FIG. 2 as $O_a$ through $O_d$. In the configuration shown, one of the two inputs of a particular signal receiver 112 receives distributed reference voltage $V_{dis}$. The second of the two inputs is a data signal D, which is specified and evaluated relative to $V_{dis}$ to represent a binary value. For example, a binary "1" might be represented by a data signal D that is greater than $V_{dis}$, while a binary "0" might be represented by a data signal D that is less than $V_{dis}$. The respective data signals are designated in FIG. 2 as $D_a$ through $D_d$.

Integrated circuit 100 further comprises driver means having a variable voltage gain for producing a compensated reference voltage. Such driver means in the described embodiment comprise a reference voltage driver 114 that produces a compensated reference voltage $V_{comp}$. Routing means are provided for routing the compensated reference voltage $V_{comp}$ on the integrated circuit to form the distributed reference voltage $V_{dis}$ at receivers 112. Specifically, the compensated reference voltage $V_{comp}$ is routed on the integrated circuit through traces to the individual data receivers 112, and forms $V_{dis}$ at the receivers 112. Compensated reference voltage $V_{comp}$ is subject to signal degradations such as noise coupling and voltage changes over the lengths of the traces. The degraded reference voltage is what is received by components 112(a) through 112(d); $V_{dis}$ is a degraded or voltage-changed form of $V_{comp}$. Depending on the direction of current leakage, $V_{dis}$ might be either higher or lower than $V_{comp}$. In a circuit where the input stages of components 112(a) through 112(d) sink current, the voltage degradation will normally correspond to a voltage drop relative to $V_{comp}$. In circuits where the input stages of components 112(a) through 112(d) source current, the voltage degradation will normally correspond to a voltage increase relative to $V_{comp}$.

More specifically, the distribution traces have finite resistances or impedances along their lengths that contribute to the degradation or voltage change of distributed reference voltage $V_{dis}$. Such resistances are represented in FIG. 2 by finite resistor elements $R_a$ through $R_d$, although it should be recognized that the resistances are distributed along the lengths of the traces rather than being discrete elements. Furthermore, signal receivers 112 have input characteristics that contribute to the degradation of distributed reference voltage $V_{dis}$. Such input characteristics typically include finite input impedances and/or leakage currents.

Specifically, the signal receivers have leakage currents that are represented in FIG. 2 by symbols $I_a$ through $I_d$. It should be noted that although the noted leakage currents typically result from input characteristics of receivers 112, such as CMOS gate leakage, they could also be due to other factors. For example, some circuits might utilize an input capacitance to reduce high-frequency noise or to perform some other function. An input capacitance such as this can be an additional source of leakage current. Furthermore, leakage currents $I_a$ through $I_d$ might be either positive or negative. In a circuit implemented with bipolar transistor technology, for example, a receiver input might comprise the base of a bipolar transistor. If the transistor is an NPN transistor, there will normally be a positive base current, into the receiver input. If the transistor is a PNP transistor, however, the base will typically source a negative base current.

As discussed above in the "Background" section, trace resistances $R_a$ through $R_d$ and leakage currents $I_a$ through $I_d$ can be a significant cause of reference voltage signal degradation. Specifically, these factors cause a voltage change in distributed reference voltage $V_{dis}$ relative to compensated reference voltage $V_{comp}$ (either an increase or a decrease, depending on the directions of leakage currents $I_a$ through $I_d$). This voltage change is at least partially a function of the lengths of the traces and the input characteristics of the receivers 112.

Compensated reference voltage $V_{comp}$ is preferably distributed in a star, Kelvin, length-matched, or impedance-matched configuration to approximately equalize signal degradations in distributed reference voltage $V_{dis}$ as it is received by the various signal receivers. In addition, data signals D are typically routed in a similar fashion as distributed reference voltage $V_{dis}$ so that the data signals are subject to approximately the same degradations as distributed reference voltage $V_{dis}$.

Generally, the various signal paths to the inputs of receivers 112 are designed to have matching impedances, to result in similar voltage degradations over the lengths of the signal paths. In situations where the respective conductors or traces that convey $V_{dis}$ to the various signal receivers have approximately the same physical and/or electrical characteristics (i.e., similar conductive metal, width, and thickness), the conductors are simply length-matched to achieve such impedance matching. In many cases, the signal paths or conductors will be considered to be matched if their impedances fall within approximately 10% of each other, although various circuits might require more or less matching precision, depending on the nature of the circuits and process technologies utilized. In some applications, it may be desirable to match impedances to within 1%.

Reference voltage driver 114 is responsive to feedback derived from distributed reference voltage $V_{dis}$ to adjust compensated reference voltage $V_{comp}$ so that $V_{dis}$ is approximately equal to a nominal reference voltage $V_{nom}$. Such feedback is produced by a feedback component 120. Feedback component 120 comprises feedback means for evaluating distributed reference voltage $V_{dis}$ relative to nominal reference voltage $V_{nom}$ to derive or produce a feedback signal F. Reference voltage driver 114 is responsive to feedback signal F to increase and decrease compensated reference voltage $V_{comp}$ as necessary to make distributed reference voltage $V_{dis}$ approximately equal to nominal reference voltage $V_{nom}$.

In the described embodiment, feedback component 120 is a receiver that is designed similarly to data signal receivers 112: as a signal comparator that compares two input voltages and produces a binary output depending on which of the input voltages is greater. As with data signal receivers 112, one of the inputs is configured to receive distributed reference voltage $V_{dis}$.

In a preferred embodiment, distributed reference voltage $V_{dis}$ is provided to feedback receiver 120 in the same way it is provided to signal receivers 112, to result in similar degradations or voltage changes at the signal receivers 112 and the feedback receiver 120. That is, $V_{comp}$ is distributed utilizing a star, Kelvin, length-matched, or impedance-matched physical routing to form $V_{dis}$ at each of the data receivers 112 and at feedback receiver 120. In the situation where the conductors have similar physical and/or electrical characteristics (i.e., similar conductive metal, width, and thickness), the traces are similarly routed so that the trace lengths are approximately the same between each individual receiver (both data signal receivers 112 and feedback receiver 120) and reference voltage driver 114. More generally, the conductors or traces are impedance-matched to achieve similar voltage degradations or changes at the signal receivers 112 and the feedback receiver 120. Again, in many cases the impedances will be considered matched if they are within 10% of each other, although the matching precision will vary depending on the particular constraints and design goals of the circuit and the process technologies utilized in forming the conductors. In some applications, it may be desirable to match impedances to within 1%.

The trace impedance is represented in FIG. 2 as RF. The desired result of the length-matched or impedance-matched routing is that all trace impedances, $R_a$, $R_b$, $R_c$, $R_d$, and $R_F$ are approximately matched or equal, and that $V_{dis}$ is subject to approximately the same signal degradations as it is routed to both signal receivers 112 and feedback receiver 120.

Furthermore, feedback receiver 120 is designed and configured to have similar input characteristics—specifically, a similar input impedance—as data signal receivers 112, in order to contribute similar degradation or signal drop to $V_{dis}$ at feedback receiver 120. Because of this, feedback receiver 120 exhibits a similar amount of input current leakage $I_F$ as data signal receivers 112. That is, $I_a$, $I_b$, $I_c$, $I_d$, and $I_F$ are all approximately equal (again, a 10% variance will usually be considered to be approximately equal, although 1% may be desirable in certain applications). This, in combination with the length-matched distribution of the 11 reference voltage, results in a voltage drop in $V_{dis}$ relative to $V_{comp}$ that is approximately the same at feedback receiver 120 as it is at each of the data receivers 112. Thus, $V_{dis}$ is approximately the same (within 10%, or 1% for more sensitive applications) at feedback receiver 120 and at each of data receivers 112.

The second input of feedback receiver 120 is configured to receive nominal reference voltage $V_{nom}$. $V_{nom}$ is the nominal or desired voltage of $V_{dis}$, and is provided to feedback receiver 120 in a manner such that it is not subject to significant voltage drop or other signal degradations. For instance, $V_{nom}$ might be distributed using a relatively short and/or wide trace to avoid a voltage drop.

Feedback receiver 120 may be configured so that it produces a feedback signal F that is positive or logically true when $V_{dis}$ is less than $V_{nom}$ and negative or logically false when $V_{dis}$ is greater than $V_{nom}$. Reference voltage driver 114 is configured to respond to feedback signal F by increasing compensated reference voltage $V_{comp}$ when signal F is true and decreasing compensated reference voltage $V_{comp}$ when signal F is false. The result is that $V_{comp}$ is increased when $V_{dis}<V_{nom}$ and $V_{comp}$ is decreased when $V_{dis}>V_{nom}$. This ensures that $V_{dis}$ remains approximately equal to $V_{nom}$. Alternatively, feedback receiver 120 may be configured so that it produces a feedback signal F that is negative or logically false when $V_{dis}$ is less than $V_{nom}$ and positive or logically true when $V_{dis}$ is greater than $V_{nom}$; and driver 114 may be configured to respond to feedback signal F by increasing compensated reference voltage $V_{comp}$ when signal F is false and decreasing $V_{comp}$ when F is true.

Feedback receiver 120 optionally incorporates a low-pass filter after its input stage, implemented in such a way that it does not significantly affect the input characteristics of the feedback receiver. In a preferred embodiment, the low-pass filter comprises a capacitor that is added to the receiver after its gain stage. The capacitor works together with a resistive gain load to introduce a low-pass filter effect without affecting the input stage.

Figure 3:
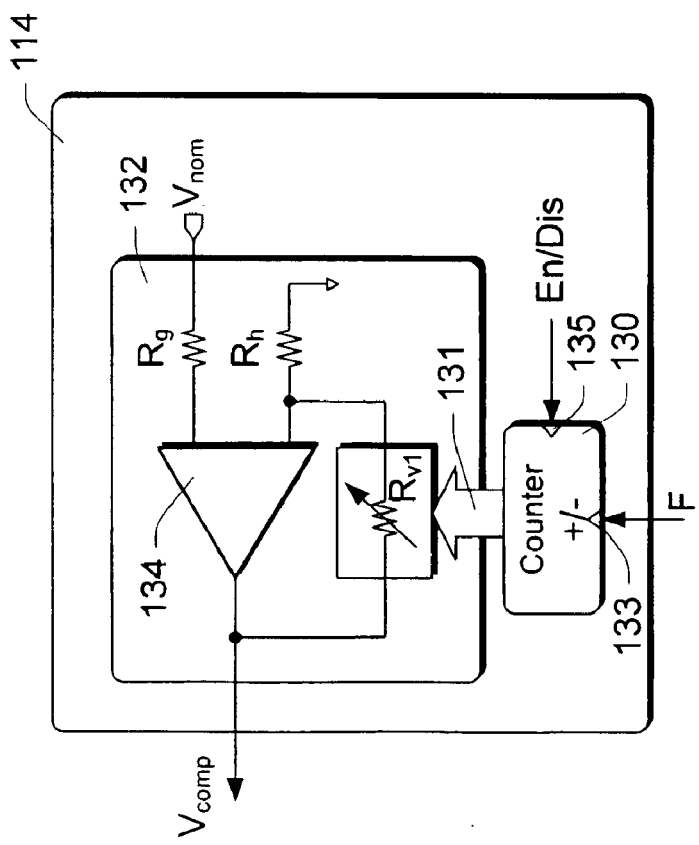
FIG. 3 is a schematic view of a one embodiment of a reference voltage driver such as used in the circuit of FIG. 2.

FIG. 3 shows an exemplary implementation of reference voltage driver 114. In this implementation, the voltage driver comprises an increment/decrement component or up/down counter 130 and a variable gain amplifier 132. Generally, up/down counter 130 is configured to increment and decrement a digital value 131 depending on the relationship of the distributed reference voltage $V_{dis}$ and the nominal reference voltage $V_{nom}$, as indicated by feedback signal F. Specifically, counter 130 increments value 131 when $V_{dis}<V_{nom}$ and decreases value 131 when $V_{dis}>V_{nom}$. Even more specifically, up/down counter 130 has an up/down or +/−input 133 that receives feedback signal F. When feedback signal F is logically true, the counter periodically increments digital output value 131. When feedback signal F is logically false, the counter periodically decrements digital output value 131. The output value 131 in this embodiment comprises a plurality of individual bit lines.

Counter 130 functions as a means of controlling the voltage gain of driver 114. Output value 131 is supplied to variable gain amplifier 132, which has a variable gain that is controlled or established by value 131: higher values cause amplifier 132 to have a higher gain, while lower values cause amplifier 132 to have a lower gain. Thus, the gain of amplifier 132 increases when $V_{dis}<V_{nom}$ and decreases when $V_{dis}>V_{nom}$.

In the illustrated embodiment, variable gain amplifier 132 comprises an op-amp 134 capable of sinking or sourcing current to provide positive or negative amplification of nominal reference voltage $V_{nom}$. Op-amp 134 is biased by resistors $R_g$, $R_h$, and $R_{v1}$. A first input of op-amp 134 receives $V_{nom}$ through $R_g$. A second input of amplifier 134 is connected to ground through $R_h$. The gain of amplifier 132 is controlled by a digitally controllable variable resistor $R_{v1}$, which is connected in series between the second input and the output of the op-amp 134. In the described embodiment, $R_g$ has half the resistance of $R_h$. $R_h$ is equal to a nominal or intermediate value within the range of resistances that can be produced by variable resistor $R_{v1}$. The resistive value of resistor $R_{v1}$ is controlled by value 131, received from counter 130. The bandwidth of op-amp 134 can be further limited by additional capacitance to reduce noise, thereby eliminating the need for a low-pass filter.

In a preferred embodiment, variable resistor $R_{v1}$ can be implemented as a series of binary-weighted resistances, each of which is potentially shorted by a corresponding control transistor. The gates of the control transistors can be connected to the individual bit lines of value 131, so that a logical true on any particular bit line causes a corresponding resistance to be included in the series, and a logical false causes the corresponding resistance to be omitted from the series.

Both variable resistor $R_{v1}$ and variable gain amplifier 132 can be implemented in a variety of different ways.

Optionally, counter 130 has an enable/disable input 135 that enables and disables counter 130. For example, counter 130 may increment or decrement output value 131 when the enable/disable input is logically true, but hold output value 131 constant whenever the enable/disable input is logically false.

The enable/disable input allows the gain of amplifier 132 to be set during an initialization period. For example, the enable/disable input may be controlled so that counter 130 is responsive to feedback signal F only during the initialization period. During an operational period following the initialization period, enable/disable input may be set to the disable mode so that digital value 131 remains constant. Thus, the gain of amplifier 132 may be set during an initialization period and may remain constant during a subsequent operational period.

Utilizing an initialization period to establish a desired amplifier gain is advantageous because the surrounding circuits can be disabled or otherwise configured to generate less noise and interference, thereby producing a more accurate, steady-state evaluation of the proper gain for amplifier 132. Once the proper gain is determined, it can be held steady, which is desirable during actual operation of the integrated circuit. Optionally, the initialization can be repeated at specified intervals to correct for voltage drifts.

Note that although FIG. 2 shows a dedicated feedback receiver, other implementations might utilize an existing data receiver as a feedback component during an initialization period. To accomplish this, data signal D and nominal reference voltage $V_{nom}$ would be multiplexed at an input of a signal receiver. During initialization, the receiver would receive $V_{nom}$ at its input. During normal operation, the receiver would receive the data signal D.

Figure 4:
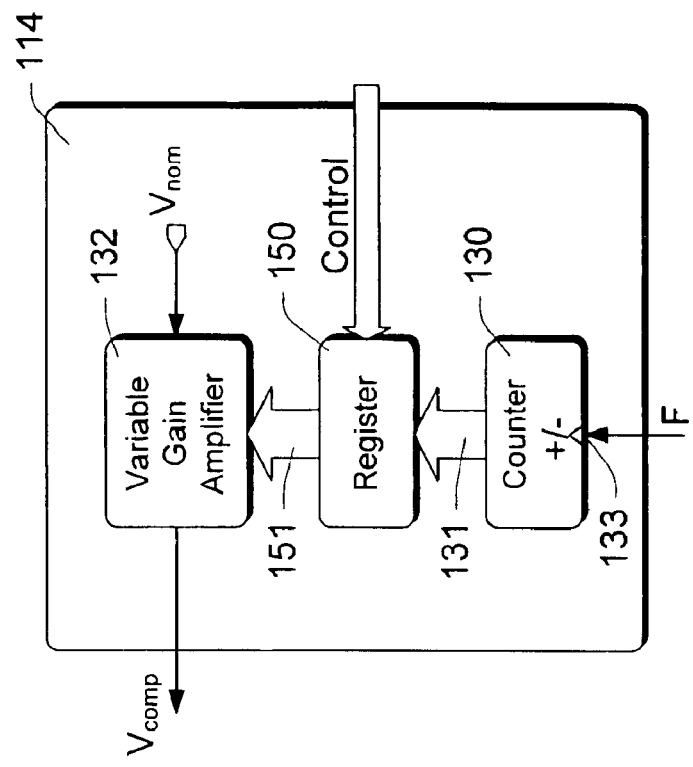
FIG. 4 is a schematic view of another embodiment of a reference voltage driver such as used in the circuit of FIG. 2. Similar components in FIGS. 4 and 3 are indicated by identical reference designators.

FIG. 4 shows an alternative embodiment that is similar to the embodiment of FIG. 3. As depicted in FIG. 4, driver 114 includes a storage register 150 that is located between counter 130 and variable gain amplifier 132. In this embodiment, control circuits (not shown) may be used to latch value 131 into register 150, from counter 130, after an initialization period. The register provides this latched value, designated in FIG. 4 by reference numeral 151, to variable gain amplifier 132 to control the gain of amplifier 132.

In this embodiment, various control signals, collectively designated by the label "Control" in FIG. 4, are available for use by control circuits within integrated circuit 100 to perform various operations with respect to storage register 150. Such control signals can include a latch signal that latches value 131 into register 150. In addition, the control signals might include data and control signals allowing the value stored by register 150 to be written and read. During a typical initialization or calibration period, register 150 is controlled so that its output 151 duplicates output 131 of counter 130. Once a steady state is reached, register 150 is controlled so that it maintains a constant output 151, regardless of further changes in counter value 131.

An advantage of this configuration is that the value 151 that results from initialization can be read by control circuitry to determine operating parameters of the integrated circuit. Specifically, the control circuitry can determine the adjusted gain of variable amplifier 132 and can potentially use this value to infer other device parameters. Furthermore, register 150 can optionally be written to by control circuits in order to force the gain of amplifier 132 to some predetermined level.

The read/write capabilities of register 150 can potentially be used for a variety of functions. For example, by setting value 151 to a wide range of values it is possible to determine the upper and lower limits of $V_{comp}$ that result in correct operation of the device. Specifically, $V_{comp}$ can be lowered (by reducing value 151) while testing the circuit at each value, until a value is reached that causes a circuit failure. Subsequently, $V_{comp}$ can be raised (by increasing value 151) until a value is reached that causes a circuit failure. The range of operational $V_{comp}$ values will indicate the available voltage margin of the circuit.

As another example, assume that a reference voltage is received from an external source and needs to be somehow translated for use by local circuits. To accomplish this using the circuit of FIG. 4, the external reference voltage is received by amplifier 132 as $V_{nom}$. During a calibration procedure, a calibrated value 151 is determined that will result in a $V_{dis}=V_{nom}$. This value is read from register 150 and an offset value is added. The resultant value is programmed back into register 150 and used during normal operation of the device, to result in a $V_{dis}$ that is offset from $V_{nom}$ by a desired margin. The desired offset value can be determined at design time and added to the calibrated value 151 after each calibration procedure. Alternatively, the desired offset value can be determined dynamically, as part of an initialization or calibration procedure.

Figure 5:
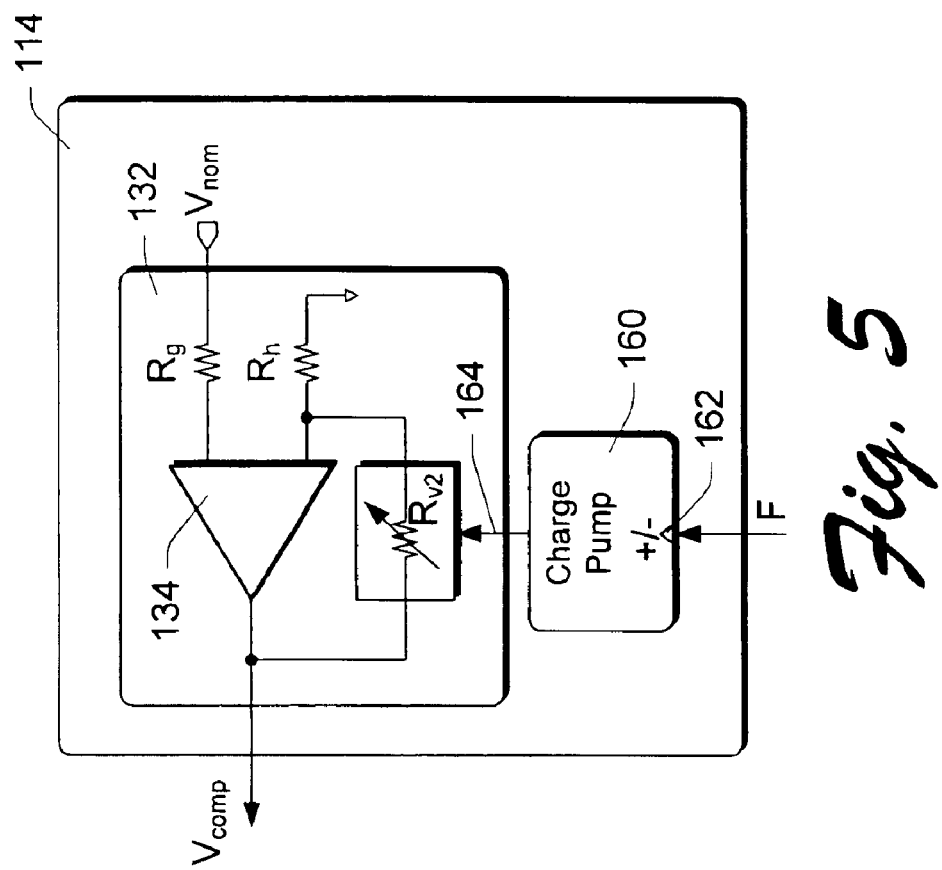
FIG. 5 is a schematic view of yet another embodiment of a reference voltage driver such as used in the circuit of FIG. 2. Similar components in FIGS. 5 and 3 are indicated by identical reference designators.

FIG. 5 shows another embodiment of reference voltage driver 114. This embodiment is similar to the previous embodiments, except that feedback signal F is used to control a charge pump 160. The charge pump is a capacitive device having a control input 162 that receives feedback signal F. Charge pump 160 charges a capacitance when feedback signal F is logically true, and discharges a capacitance when feedback signal F is logically false. Charge pump 160 has an analog control voltage output 164 that reflects the voltage of the capacitance. In response to feedback signal F, the control voltage produced at output 164 increases when $V_{dis}<V_{nom}$ and decreases when $V_{dis}>V_{nom}$. Output 164 of charge pump 160 is configured to control the gain of reference voltage driver 114. Other types of analog storage devices might be used in place of charge pump 160, such as sample and hold devices.

In the embodiment of FIG. 5, variable resistor $R_{v2}$ comprises an analog variable resistor whose resistance is controlled by output 164 of charge pump 160. As an example, the variable resistor might comprise a weighted PMOS adjustable resistor. Similar to the embodiments of FIG. 3 variable resistor variable resistor $R_{v2}$ is configured to control the gain of amplifier 132.

Although the embodiments above are described primarily as being used to adjust a distributed reference voltage $V_{dis}$ to be approximately equal to a nominal reference voltage $V_{nom}$. However, the described techniques can also be used to provide a distributed reference voltage $V_{dis}$ having some non-equal relationship with reference voltage $V_{nom}$. For example, in the embodiment of FIG. 4 that utilizes a storage register 150, value 151 can be changed in a predefined manner after initialization to offset or translate $V_{dis}$ relative to $V_{nom}$.

The various embodiments described above provide an effective way of establishing a voltage and of compensating or adjusting such a voltage for degradations that might otherwise occur due to factors such as interconnect resistances and device leakage currents. Although the embodiments described above operate with respect to a reference voltage, the same or similar techniques can be used with respect to other types of DC voltages. For example, the described techniques can be used to compensate or adjust supply voltages, ground voltages, and bias voltages.

The circuits and techniques described above are particularly useful in integrated circuits, where shrinking geometries have resulted in interconnect traces having increasingly higher impedances. However, the described subject matter can also be used to compensate voltages in other types of circuits, such as voltages distributed between discrete components of PCBs (printed circuit boards) and other circuits.

The applicant has found these circuits and techniques to be particularly beneficial in various types of integrated circuit memory and PCB memory circuits, such as dynamic memory devices and boards. Many high-speed memory technologies utilize differential and pseudo-differential signaling techniques, and it is particularly beneficial in these circuits to keep distributed voltages within close tolerances.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. An integrated circuit, comprising:
   a plurality of data receivers that evaluate corresponding data signals relative to a distributed reference voltage;
   a feedback receiver that evaluates the distributed reference voltage relative to a nominal reference voltage to produce a feedback signal;
   a reference voltage driver that produces a compensated reference voltage;
   wherein the compensated reference voltage is routed on the integrated circuit to form the distributed reference voltage at the data and feedback receivers, and the input characteristics of the data and feedback receivers cause a voltage change in the distributed reference voltage at each receiver relative to the compensated reference voltage;
   wherein the data and feedback receivers have similar input characteristics so that said relative voltage change in the distributed reference voltage is approximately the same at each of the data and feedback receivers;
   wherein the reference voltage driver includes an increment/decrement component that produces a digital value in response to the feedback signal, wherein the increment/decrement component is configured to increment and decrement the digital value depending on the relationship of the distributed reference voltage and the nominal reference voltage as indicated by the feedback signal; and
   wherein the reference voltage driver has a variable gain that is established by the digital value.

2. An integrated circuit as recited in claim 1, wherein the compensated reference voltage is distributed over impedance-matched conductors to form the distributed reference voltage at the data and feedback receivers.

3. An integrated circuit as recited in claim 1, wherein the increment/decrement component is enabled during an initialization period and the digital value remains constant during a subsequent operational period.

4. An integrated circuit as recited in claim 1, further comprising a register that is configurable to store the digital value and to provide the digital value to the reference voltage driver.

5. An integrated circuit as recited in claim 1, further comprising a register that is configurable to store the digital value and to provide the digital value to the reference voltage driver, wherein the register is readable and writable.

6. An integrated circuit as recited in claim 1, further comprising a digitally controllable variable resistor that controls the gain of the reference voltage driver.

7. An integrated circuit as recited in claim 1, wherein the feedback receiver comprises a low-pass filter that does not significantly affect the input characteristics of the feedback receiver.

8. An integrated circuit as recited in claim 1, wherein the distributed reference voltage is routed similarly to the data and feedback receivers so that said relative voltage change in the distributed reference voltage is approximately the same at each of tic data and feedback receivers.

9. An integrated circuit as recited in claim 1, wherein:
   the distributed reference voltage is routed similarly to the data and feedback receivers so that said relative voltage change in the distributed reference voltage is approximately the same at each of the data and feedback receivers; and
   the feedback receiver comprises a low-pass filter that does not significantly affect the input characteristics of the feedback receiver.

10. An integrated circuit as recited in claim 1, wherein the integrated circuit is a memory device that further comprises a plurality of memory storage cells.

11. An integrated circuit, comprising:
    receiver means for evaluating a plurality of data signals relative to a distributed reference voltage;
    feedback means for evaluating the distributed reference voltage relative to a nominal reference voltage to produce a feedback signal;
    driver means having a variable gain for producing a compensated reference voltage;
    routing means for routing the compensated reference voltage on the integrated circuit to form the distributed reference voltage at the receiver and feedback means;
    wherein the input characteristics of the receiver and feedback means cause a voltage change in the distributed reference voltage at the receiver and feedback means relative to the compensated reference voltage;
    wherein the receiver and feedback means have similar input characteristics so that said relative voltage change in the distributed reference voltage is approximately the same at each of the receiver and feedback means; and
    gain control means for controlling the gain of the driver means in response to the feedback signal so that the distributed reference voltage is approximately equal to the nominal reference voltage;
    wherein the compensated reference voltage is distributed over impedance-matched conductors to form the distributed reference voltage at the receiver and feedback means.

12. A memory device comprising:
    a plurality of memory storage cells that are capable of storing data;

a plurality of data receivers that evaluate binary data signals with reference to a distributed reference voltage and that are coupled to the plurality of memory storage cells;

a feedback receiver that evaluates the distributed reference voltage relative to a nominal reference voltage to produce a feedback signal;

a reference voltage driver that produces a compensated reference voltage;

wherein the compensated reference voltage is routed on the memory device to form the distributed reference voltage at the data and feedback receivers, and the input characteristics of the data and feedback receivers cause a voltage change in the distributed reference voltage at each receiver relative to the compensated reference voltage;

wherein the data and feedback receivers have similar input characteristics so that said relative voltage change in the distributed reference voltage is approximately the same at each of the data and feedback receivers; and wherein the reference voltage driver has a variable gain that is configurable to increase in response to the feedback signal when the distributed reference voltage is less than the nominal reference voltage and to decrease in response to the feedback signal when the distributed reference voltage is greater than the nominal reference voltage;

wherein the compensated reference voltage is distributed over impedance-matched conductors to form the distributed reference voltage at the data and feedback receivers.

* * * * *